(12) United States Patent
Stadnisky

(10) Patent No.: US 10,601,902 B2
(45) Date of Patent: *Mar. 24, 2020

(54) WIRELESSLY CONNECTED LABORATORY

(71) Applicant: FlowJo, LLC, Ashland, OR (US)

(72) Inventor: Michael D. Stadnisky, Ashland, OR (US)

(73) Assignee: FlowJo, LLC, Ashland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,738

(22) Filed: Sep. 20, 2018

(65) Prior Publication Data

US 2019/0037008 A1    Jan. 31, 2019

Related U.S. Application Data

(63) Continuation of application No. 14/722,820, filed on May 27, 2015, now Pat. No. 10,091,279.

(51) Int. Cl.
  *G06F 15/16*     (2006.01)
  *H04L 29/08*     (2006.01)
  (Continued)

(52) U.S. Cl.
  CPC ............. *H04L 67/10* (2013.01); *H04L 67/12* (2013.01); *H04W 4/38* (2018.02); *H04W 4/80* (2018.02)

(58) Field of Classification Search
  CPC .......... H04L 67/10; H04L 67/12; H04W 4/38; H04W 4/80
  (Continued)

(56) References Cited

U.S. PATENT DOCUMENTS 5,434,971 A * 7/1995 Lysakowski, Jr. .... G06F 17/246
                                                    702/31
5,446,575 A * 8/1995 Lysakowski, Jr. .... G06F 16/258
(Continued)

FOREIGN PATENT DOCUMENTS

CN   103686696 A    3/2014
WO   WO 2015/013688  1/2015

OTHER PUBLICATIONS

International Search Report and Written Opinion dated Oct. 20, 2016 in corresponding International Application No. PCT/US2016/034299.

(Continued)

*Primary Examiner* — Moustafa M Meky
*Assistant Examiner* — Thorne E Waugh
(74) *Attorney, Agent, or Firm* — Knobbe, Martens, Olson & Bear, LLP

(57) ABSTRACT

Scientific instruments can be network-enabled by adding a wireless communication capability to the computers associated with those scientific instruments. Through this wireless communication capability, the scientific data acquired by a scientific instrument and metadata about that scientific data can be wirelessly transferred from the instrument-associated computer to a data hub. By way of example, a wireless personal area network (PAN) can be established between the instrument-associated computer and the data hub. From the data hub, the scientific data can be further communicated to remote servers via another network connection. Furthermore, in another example embodiment, the wireless communication capability between the instrument-associated computer and the data hub can be leveraged as a conduit for passing commands from the data hub or other devices in communication with the data hub to the instru- (Continued)

ment-associated computer for controlling the operation of the scientific instrument.

20 Claims, 11 Drawing Sheets

(51) Int. Cl.
*H04W 4/80* (2018.01)
*H04W 4/38* (2018.01)

(58) Field of Classification Search
USPC .................................................. 709/203–248
See application file for complete search history.

(56) References Cited

U.S. PATENT DOCUMENTS

| | | | | |
|---|---|---|---|---|
| 6,853,894 | B1* | 2/2005 | Kolls | G01M 17/007 340/426.36 |
| 6,895,310 | B1* | 5/2005 | Kolls | G01M 17/007 341/123 |
| 8,170,887 | B2* | 5/2012 | Rosenfeld | G16H 50/20 705/2 |
| 8,768,731 | B2* | 7/2014 | Moore | G06F 19/325 705/4 |
| 9,619,627 | B2 | 4/2017 | Holmes | |
| 9,971,599 | B2* | 5/2018 | Kelm | G06F 9/4552 |
| 9,973,534 | B2* | 5/2018 | Mahaffey | H04L 63/20 |
| 10,015,720 | B2* | 7/2018 | Perdomo | H04L 5/0007 |
| 10,091,279 | B2 | 10/2018 | Stadnisky | |
| 2004/0266015 | A1 | 12/2004 | Favuzzi et al. | |
| 2005/0038676 | A1 | 2/2005 | Showalter et al. | |
| 2005/0086285 | A1* | 4/2005 | Balasubramanian | G06F 9/5038 709/200 |
| 2005/0222933 | A1 | 10/2005 | Wesby | |
| 2007/0198708 | A1 | 8/2007 | Moriwaki et al. | |
| 2009/0012806 | A1 | 1/2009 | Ricordi et al. | |
| 2010/0070459 | A1 | 3/2010 | Zigon et al. | |
| 2011/0053289 | A1 | 3/2011 | Lowe et al. | |
| 2011/0220715 | A1 | 9/2011 | Steimle et al. | |
| 2012/0140745 | A1 | 6/2012 | Jeon et al. | |
| 2012/0158329 | A1 | 6/2012 | Hurri et al. | |
| 2013/0071858 | A1 | 3/2013 | Bui et al. | |
| 2013/0073576 | A1 | 3/2013 | Lillethun et al. | |
| 2013/0224851 | A1 | 8/2013 | Ljungmann et al. | |
| 2013/0268698 | A1 | 10/2013 | Donaghey | |
| 2014/0147860 | A1 | 5/2014 | Kaduchak et al. | |
| 2014/0234865 | A1 | 8/2014 | Gabriel | |
| 2014/0306122 | A1 | 10/2014 | Norton et al. | |
| 2014/0316841 | A1* | 10/2014 | Kilby | G06Q 10/06316 705/7.26 |
| 2014/0335505 | A1 | 11/2014 | Holmes | |
| 2014/0344282 | A1 | 11/2014 | Stivoric et al. | |
| 2015/0050688 | A1 | 2/2015 | Thrasher et al. | |
| 2015/0099458 | A1 | 4/2015 | Weisner et al. | |
| 2017/0147572 | A1* | 5/2017 | Kilby | G06Q 10/06316 |

OTHER PUBLICATIONS

Extended European Search Report dated Nov. 29, 2018 in corresponding European Application No. 16800702.9.

* cited by examiner

Figure 9

| Type of Data | End Location 1 | End Location 2 | End Location N |
|---|---|---|---|
| Flow Cytometry Data | FlowJo Enterprise Server (192.168.1.1) | State University Database (192.168.1.101) | N/A |
| Mass Cytometry Data | State University Database (192.168.1.101) | N/A | N/A |
| Clinical Trial XYZ Data | Research Institution Database (4.205.103.1) | Data Hub Hard Drive (C:/My Documents/ Clincal Trial XYZ Data | FlowJo Enterprise Server (192.168.1.1) |
| Patient ABC's Data | Research Institution Database (4.205.103.1) | FlowJo Enterprise Server (192.168.1.1) | N/A |

WIRELESSLY CONNECTED LABORATORY

CROSS-REFERENCE TO RELATED APPLICATION(S)

This application is a continuation of U.S. patent application Ser. No. 14/722,820, entitled "Wirelessly Connected Laboratory," filed May 27, 2015. Any and all priority claims identified in the Application Data Sheet, or any correction thereto, are also hereby incorporated by reference under 37 C.F.R. § 1.57.

INTRODUCTION

Generally, scientific laboratories include one or more scientific instruments and instrument-associated computers. The term "scientific instrument" as used herein refers to an instrument configured to examine one or more analytes including atoms, molecules, cells, tissues, organs, and whole organism(s) to generate scientific data representing atomic, molecular, cellular, tissue, or whole-organ properties and/or other biological properties for the analyte using components such as lasers, probes, plasma, magnets, sorters, or the like. Examples of scientific instruments include flow cytometers, mass spectrometers, microarrays, genotyping and sequencing instruments, cell sorters, mass cytometers, real-time polymerase chain reaction instruments, etc. The instrument-associated computers provide an interface for controlling the scientific instruments. In addition to instrument control, the instrument-associated computer receives and saves data acquired by the scientific instrument. Also, some instrument-associated computers may package the received data into a specific file-format, which may be proprietary or vendor-specific.

Generally, manufacturers package a scientific instrument with an instrument-associated computer. So, when a laboratory, university, hospital, research facility or any other purchaser of scientific equipment purchases a scientific instrument, the purchaser receives an instrument-associated computer provided by the scientific instrument manufacturer. Generally, the purchaser does not have a say in the specifications, manufacturer, or brand of the instrument-associated computer, nor does the purchaser have any control over large portions of the software installed on the instrument-associated computer.

The computers packaged with scientific equipment are generally not connected to a network. In fact, many manufacturers recommend that instrument-associated computers not be connected to a network and/or expressly forbid buyers to connect the instrument-associated computers to a network because a network connection may adversely affect the performance of the scientific instrument. Even if the manufacturer does not expressly forbid network connection, many information technology ("IT") professionals are hesitant to connect a computer that they did not configure to a secure and unique network. IT professionals may be resistant to connect the instrument-associated computer to a network because the instrument-associated computer lacks certain software or hardware security measures preferred by the IT professionals. In view of all these considerations, instrument-associated computers generally are not connected to wide-area networks, local-area networks, personal area networks, or any other type of network.

The instrument-associated computer's lack of network connection creates a balkanized IT environment, thereby creating data management, data auditing, and quality control issues. Data acquired by scientific instruments is valuable and needs to be backed-up or archived. Conventionally, analysts transfer data acquired by scientific instruments to data archives via USB thumb-drives and other types of "sneakerware". Analysts and instrument operators rely on sneakerware as the main, if not only, means of transferring data from acquisition instruments to other computer systems. While these methods can accomplish the process of transferring data from the instrument-associated computer to another digital storage medium, the data transfer lacks a reliable audit trail and introduces security concerns as sneakerware may contain harmful types of software (e.g. viruses, malware, Trojan horses, etc.).

Additionally, data acquired by scientific instruments may contain private medical information, and every effort to protect a patient's privacy should be made. However, the use of personal sneakerware poses a risk of violating the privacy rights of a patient as an analyst may intentionally or accidentally maintain copies of a patient's private medical data on his own personal sneakerware.

Finally, the use of sneakerware causes a delay between data acquisition, analysis, and insight. When data is acquired by the scientific instrument, the data is saved on the instrument-associated computer. To transfer the data, an analyst must find the data file in the file directory, copy the file to sneakerware, physically bring the data on the sneakerware to a second computer (e.g. an analysis computer), and copy the data from the sneakerware to the second computer. All these steps in data transfer delay and stymie downstream processes like data analysis and deriving insight from the results.

SUMMARY

It is in view of the above problems that the present invention was developed. The inventors disclose a data transfer system for life science instruments to connect to a data hub. The data transfer system leverages the data hub to upload data acquired by scientific instruments onto an archival server or other vertical-specific analysis solution. The system may include a data transceiver connected to an instrument-associated computer.

In one embodiment, a system for transmitting data comprises: a scientific instrument and an associated computer; and a data hub; wherein the computer and the data hub are configured for communication with each other via a wireless personal area network (PAN) connection according to a PAN protocol; wherein the scientific instrument is configured to acquire scientific data; wherein the computer comprises a processor, a memory, wherein the computer's processor is configured to execute a plurality of instructions stored in the computer's memory that are configured, upon execution by the computer's processor, to cause the computer to (1) command the scientific instrument, (2) receive the scientific data acquired by the scientific instrument, (3) generate metadata about the received scientific data, the metadata including data that indicates a type for the received scientific data, and (4) communicate the scientific data and the generated metadata to the data hub via the wireless PAN connection; wherein the data hub comprises a processor, a memory, and a network interface, wherein the data hub's processor is configured to execute a plurality of instructions stored in the data hub's memory that are configured, upon execution by the data hub's processor, to cause the data hub to (1) receive the communicated scientific data and the communicated metadata via the wireless PAN connection, (2) analyze the communicated metadata to determine the scientific data type for the communicated scientific data, (3)

determine an end location for the communicated scientific data based on the determined scientific data type, and (4) send the scientific data to the determined end location through the network interface.

In another embodiment, a system comprises: a scientific instrument and an associated computer; and a data hub; wherein the computer and the data hub are configured for communication with each other via a wireless personal area network (PAN) connection according to a PAN protocol; wherein the scientific instrument is configured to acquire scientific data under control by the computer; and wherein the data hub comprises a processor and a memory, wherein the data hub's processor is configured to execute a plurality of instructions stored in the data hub's memory that are configured, upon execution by the data hub's processor, to cause the data hub to wirelessly send a command over the wireless PAN connection to the computer, the command configured to control an aspect of operation for the scientific instrument; wherein the computer comprises a processor and a memory, wherein the computer's processor is configured to execute a plurality of instructions stored in the computer's memory that are configured to configured to (1) receive the command wirelessly sent by the data hub over the wireless PAN connection, and (2) relay the command to the scientific instrument to control the scientific instrument in accordance with the relayed command.

In another embodiment, a system for transmitting data comprises: a computer; and a data hub; wherein the computer and the data hub are configured for communication with each other; wherein the computer comprises a processor, a memory, wherein the computer's processor is configured to execute a plurality of instructions stored in the computer's memory that are configured, upon execution by the computer's processor, to cause the computer to (1) receive the scientific data, (2) generate metadata about the received scientific data, the metadata including data that indicates a type for the received scientific data, and (3) communicate the scientific data and the generated metadata to the data hub; wherein the data hub comprises a processor, a memory, and a network interface, wherein the data hub's processor is configured to execute a plurality of instructions stored in the data hub's memory that are configured, upon execution by the data hub's processor, to cause the data hub to (1) receive the communicated scientific data and the communicated metadata, (2) analyze the communicated metadata to determine the scientific data type for the communicated scientific data, (3) determine an end location for the communicated scientific data based on the determined scientific data type, and (4) send the scientific data to the determined end location through the network interface.

In another embodiment, an apparatus for transferring scientific data comprises: a processor; a scientific instrument in communication with the processor and configured to acquire scientific data at the direction of the processor; a wireless transmitter configured to transmit data wirelessly at the direction of the processor; wherein the processor is configured to (1) receive the scientific data from the scientific instrument, (2) generate metadata about the received scientific data, the generated metadata comprising data indicative of a type for the received scientific data, (3) identify a destination data hub for the received scientific data and the generated metadata, and (4) direct the wireless transmitter to wirelessly transmit the scientific data and the generated metadata to the destination data hub.

In another embodiment, a method for transferring scientific data comprises: receiving scientific data acquired by a scientific instrument; generating metadata indicating a type of scientific data; and transmitting the scientific data and the generated metadata to a data hub over a wireless connection, wherein the method steps are performed by a processor.

In another embodiment, an apparatus for transferring scientific data comprises: a wireless receiver configured to receive data wirelessly from a computer associated with a scientific instrument, the received data comprising scientific data acquired by the scientific instrument and metadata about the scientific data; and a processor in communication with the wireless receiver, wherein the processor is configured to (1) process the data received by the wireless receiver, (2) analyze the metadata to determine a type for the scientific data, (3) determine an end location for the scientific data based on the determined scientific data type, and (4) initiate a transmission of the data to the determined end location over a network.

In another embodiment, a method for transferring scientific data comprises: receiving scientific data wirelessly from a computer associated with a scientific instrument, the received data comprising scientific data acquired by the scientific instrument and metadata about the scientific data; processing the data received by the wireless receiver; analyzing the metadata to determine a type for the scientific data determining an end location for the scientific data based on the determined scientific data type; and initiate a transmission of the data to the determined end location over a network, wherein the method steps are performed by a processor.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 9 illustrates an example table used by the data hub to determine where to transmit data acquired by a scientific instrument.

DETAILED DESCRIPTION

Figure 1A:
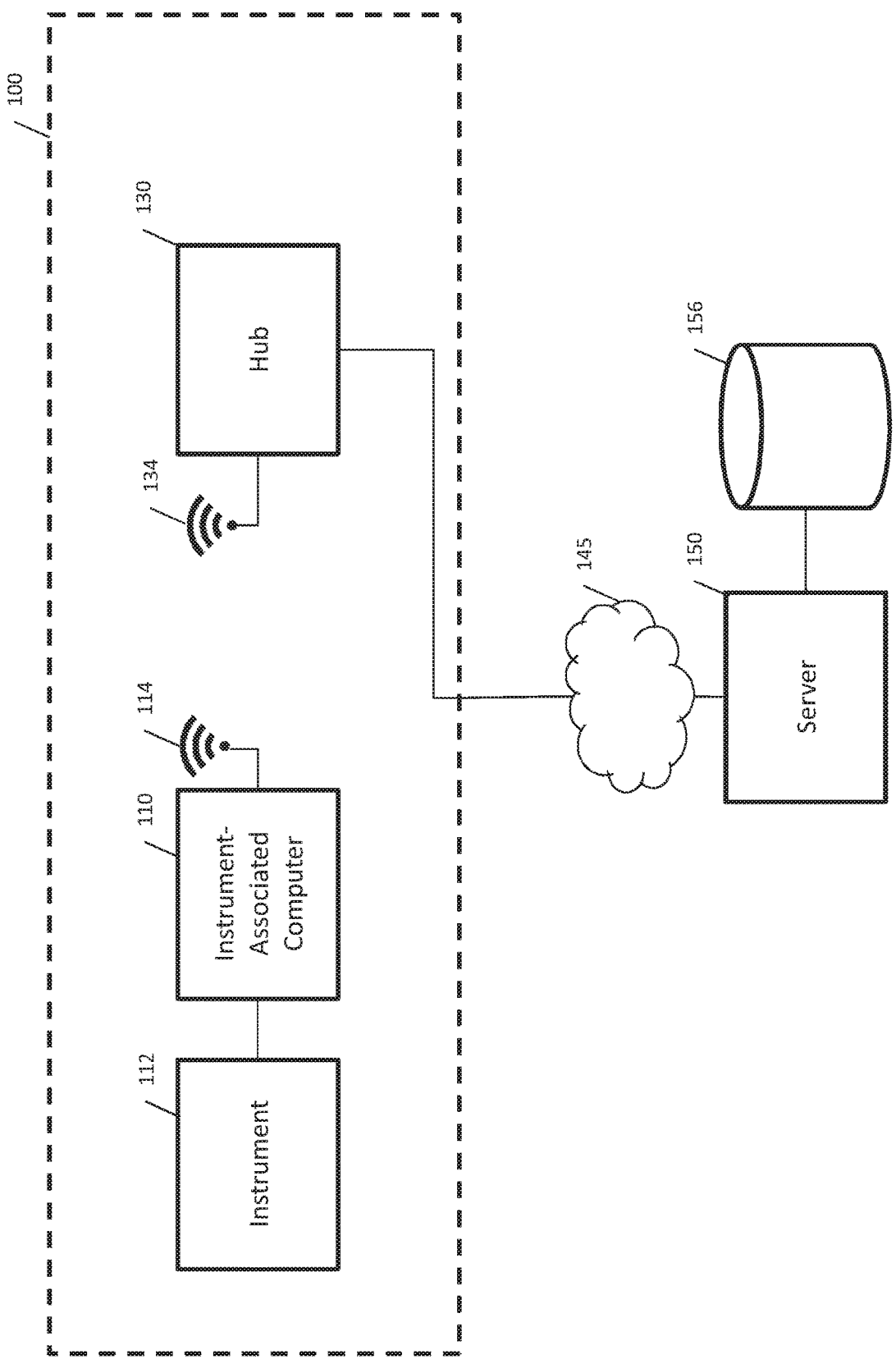
FIGS. 1A and 1B illustrate system configurations for a wirelessly connected laboratory according to an exemplary embodiment.

Referring to the accompanying drawings in which like reference numbers indicate like elements, FIG. 1A illustrates a system configuration for a wirelessly connected laboratory 100 according to an exemplary embodiment. The wirelessly connected laboratory comprises an instrument-associated computer 110, a scientific instrument 112, a data transceiver 114, a data hub 130, and a hub transceiver 134.

Figure 8:
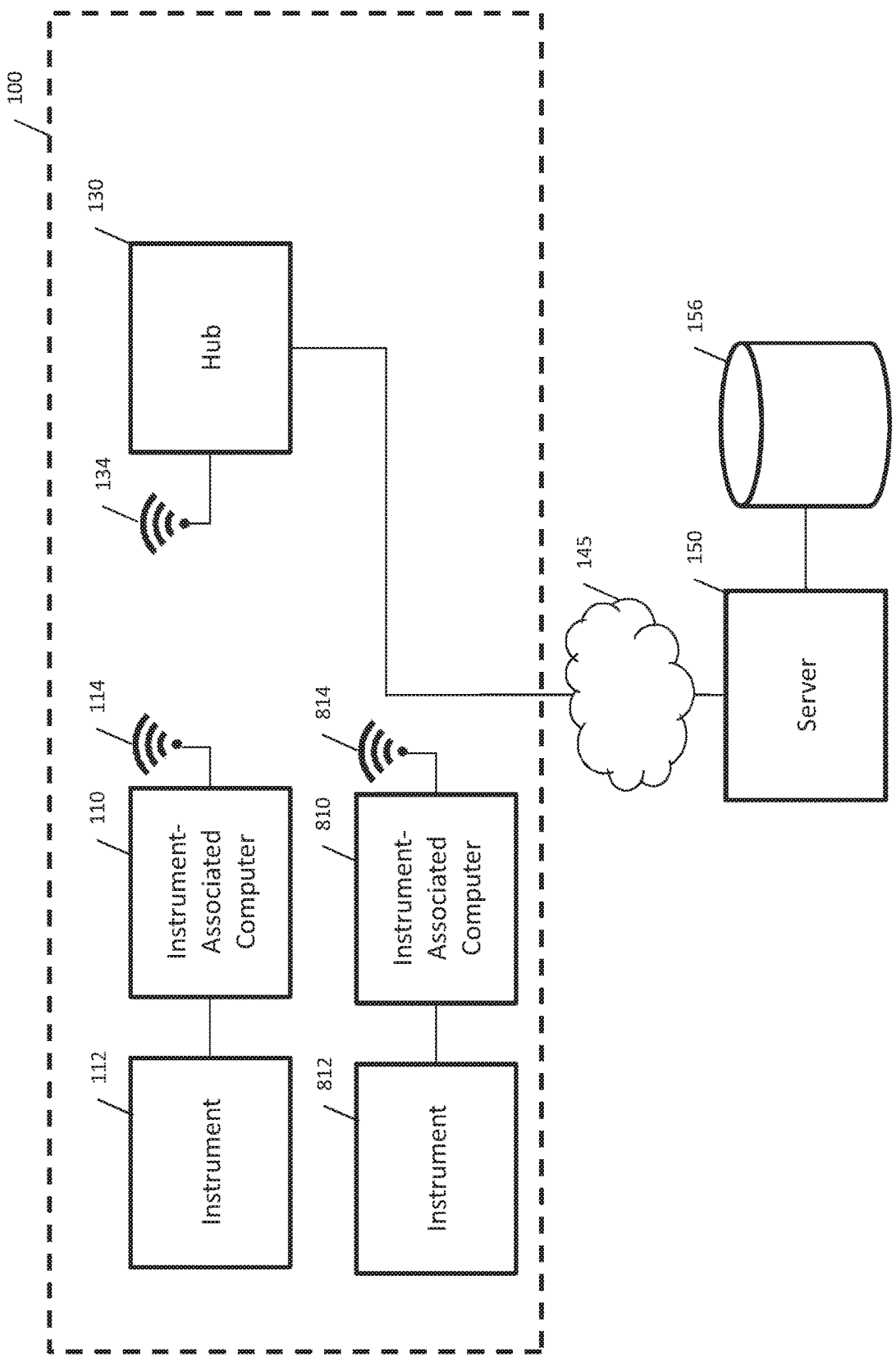
FIG. 8 illustrates a system configuration for a wirelessly connected laboratory having multiple scientific instruments according to an exemplary embodiment.

While Figure A1 illustrates one scientific instrument 112 within the wirelessly connected laboratory 100, the laboratory 100 may comprise a plurality of scientific instruments. FIG. 8 illustrates an example embodiment where the data hub 130 communicates with a first instrument-associated computer 110 and a second instrument-associated computer 810. The second instrument-associated computer 810 is associated with a second scientific instrument 812, and the second instrument-associated computer 810 communicates with the data hub 130 through a second data transceiver 814. FIG. 8 is similar to FIG. 1A and comprises similar components, but the wirelessly connected laboratory 800 of FIG. 8 comprises multiple scientific instruments 112, 812 and multiple instrument-associated computers 110, 810. The data hub 130 may communicate with both the first and second instrument-associated computers 110, 810 simultaneously, such as by using a data queue.

Referring again to FIG. 1A, the instrument 112 may be any life-science instrument such as a scientific instrument configured to generate scientific data representing atomic, molecular, cellular, tissue, organ, or whole-organism properties and/or other biological properties by measuring atoms, molecules, cells, tissues, organs, and whole organisms using components such as lasers, probes, plasma, magnets, sorters, or the like. As mentioned above, examples of scientific instruments include flow cytometers, mass spectrometers, microarrays, genotyping instruments, cell sorters, mass cytometers, etc. The instrument 112 may comprise hardware necessary to analyze biological subject matter, such as blood samples, tissues samples, single-cell data, or any other life science subject matter. The instrument 112 may be operated under control by the instrument-associated computer 110, and the instrument-associated computer 110 may control parameters and settings of the instrument 112. Furthermore, the instrument-associated computer 110 may control the instrument 112 such as by controlling robotic arms that automatically load blood samples, tissue samples, etc. into the instrument 112.

The instrument-associated computer 110 may be a specially-configured computer to communicate with, control, and receive scientific data from the instrument 112. A manufacturer of the instrument 112 may provide the instrument-associated computer 110 as part of the purchase of the instrument 112. The instrument-associated computer 110 may comprise a processor, memory, data storage, and peripherals, such as a keyboard, monitor, mouse, touch screen, etc., enabling an analyst to interact with the instrument-associated computer 110 to control the instrument 112. Also, as shown, the instrument-associated computer may include a wireless transceiver or transmitter 114.

The data hub 130 comprises a computing device, and preferably comprises a laptop computer, tablet computer, mobile phone (such as a smart phone), or any other mobile computing device. A laptop computer, tablet computer, or mobile phone having a wireless transceiver 114 may become the data hub 130 by installing data hub software, which is described further below, and connecting the laptop computer, tablet computer, or mobile phone to the instrument-associated computer 110 over a wireless network. The data hub 130 is network-connected, and it communicates with a server 150 over a wide-area network 145, such as the internet, or a local area network. The server 150 may be associated with a database 156 that stores data acquired by scientific instrument 112. The server 150 may further comprise data analysis software useful for analyzing scientific data acquired by scientific instruments. For example, the server 150 may execute FlowJo Enterprise to analyze flow cytometry data.

Figure 2:
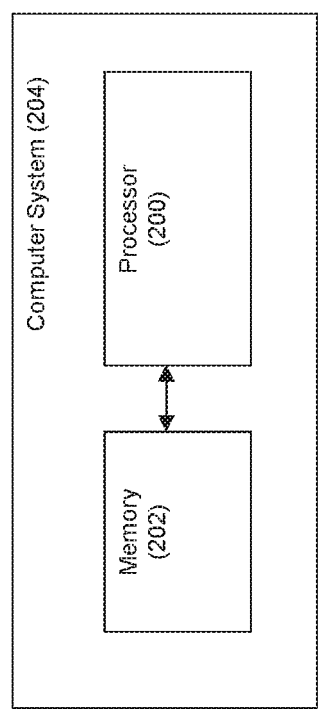
FIG. 2 illustrates a computer system according to an exemplary embodiment.

The configuration of the instrument-associated computer 110 and the data hub 130 are illustrated in FIG. 2. FIG. 2 illustrates an exemplary processor 200 and associated memory 202 which can be configured to implement data communication processes described herein in accordance with exemplary embodiments of the invention. The processor 200 and associated memory 202 may be deployed in a computer system 204. Such a computer system 204 can take any of a number of forms, including but not limited to one or more personal computers, servers, laptop/notebook/tablet computers, personal digital assistants (PDAs), or combinations of the same. For example, the computer system 204 can take the form of the instrument-associated computer 110, the data hub 130, or the server 150. The processor 200 may comprise a single processor or multiple processors, including multiple processors that are physically remote from each other. Similarly, the memory 202 can take the form of one or more physical memories. Moreover, the memory 202 can be physically remote from processor 200 if desired by a practitioner, such as a remote database accessible to the processor 200 via a network such as the Internet. Examples of suitable memories for use as memory 202 can be RAM memory, ROM memory, solid-state drive memory, hard disk drive memory, etc. The memory 202 may include both primary and secondary memories, but the memory 204 is depicted as one unit for illustration purposes.

The processor 200 can be configured to execute one or more software programs. These software programs can take the form of a plurality of processor-executable instructions that are resident on a non-transitory computer-readable storage medium such as memory 202. For example, the one or more software programs may comprise an software programs to control the instrument 112 and/or software configured to transfer data from the instrument-associated computer to an end-location for the data, such as the database 156.

Referring again to FIG. 1A, the instrument-associated computer 110 forms a wireless connection to with the data hub 130 to connect to a local area network or a wide area network through the data hub. Instead, the instrument-associated computer 110 leverages its associated transceiver 114 to communicate wirelessly with the data hub 130. The transceiver 114 connected to the instrument-associated computer 110 is configured to communicate with the data hub 130. For example, software installed on the instrument-associated computer may be configured to search for computers identifying themselves as data hubs 130 within range of the wireless transceiver 114. The data hub 130 may transmit a signal identifying itself as a data hub 130 and the instrument-associated computer 110 may ignore other computers having a wireless transceiver that are not identified as the data hub. For example, if more than one instrument-associated computer 110 is located within the wirelessly connected laboratory 100, such as in the embodiment shown in FIG. 8, the first instrument-associated computer 110 may not connect to the second instrument-associated computer 810 because the second instrument-associated computer 810 may not identify itself as the data hub 130. For the protection of data collected by the scientific instrument 112, the instrument-associated computer 110 may transmit data only to a computer identifying itself as the data hub 130.

In one embodiment, the data hub 130 is a host computer, and the instrument-associated computer 110 is a client computer. In some embodiments, the wireless communication between the data hub 130 and the instrument-associated computer 110 is a personal area network ("PAN"), such as Bluetooth, Zigbee, infrared, near-field communication, wireless USB, Wifi (IEEE 802.11), or any other wireless personal area network. In some embodiments, the data hub 130 may pair with the instrument-associated computer 110 before transferring data, thereby allowing data communication one a one-to-one basis. In other embodiments, the data hub 130 connects to multiple clients at once, while the instrument-associated computer 110 only communicates with one device, the data hub 130.

The transceivers 114, 134 may be transceivers that are built-in to their respective computer 110 or hub 130, or they may be aftermarket devices, such as aftermarket USB dongles. For example, the transceiver 114 associated with the instrument-associated computer 110 may be a USB Bluetooth dongle installed on the instrument-associated computer 110, while the transceiver 134 associated with the data hub 130 may be an internal Bluetooth transceiver included with the data hub's 130 other standard hardware.

The data communication between the data hub 130 and the instrument-associated computer 110 may be unidirectional or bidirectional depending on the application or software executed by the data hub 130 and the instrument-associated computer 110. The scientific data transmitted to the data hub 130 may comprise data in any format, such as Flow Cytometry Standard (FCS) files, comma separated values (CSV) files, classification results (CLR) files, workspace (WSP) files, a proprietary format set by a manufacturer of the instrument 112, or any other data format. The instrument-associated computer 110 may be configured to store the data collected by the scientific instrument 112 in one of these formats according to the instrument control protocol installed on the instrument-associated computer 110.

Figure 1B:
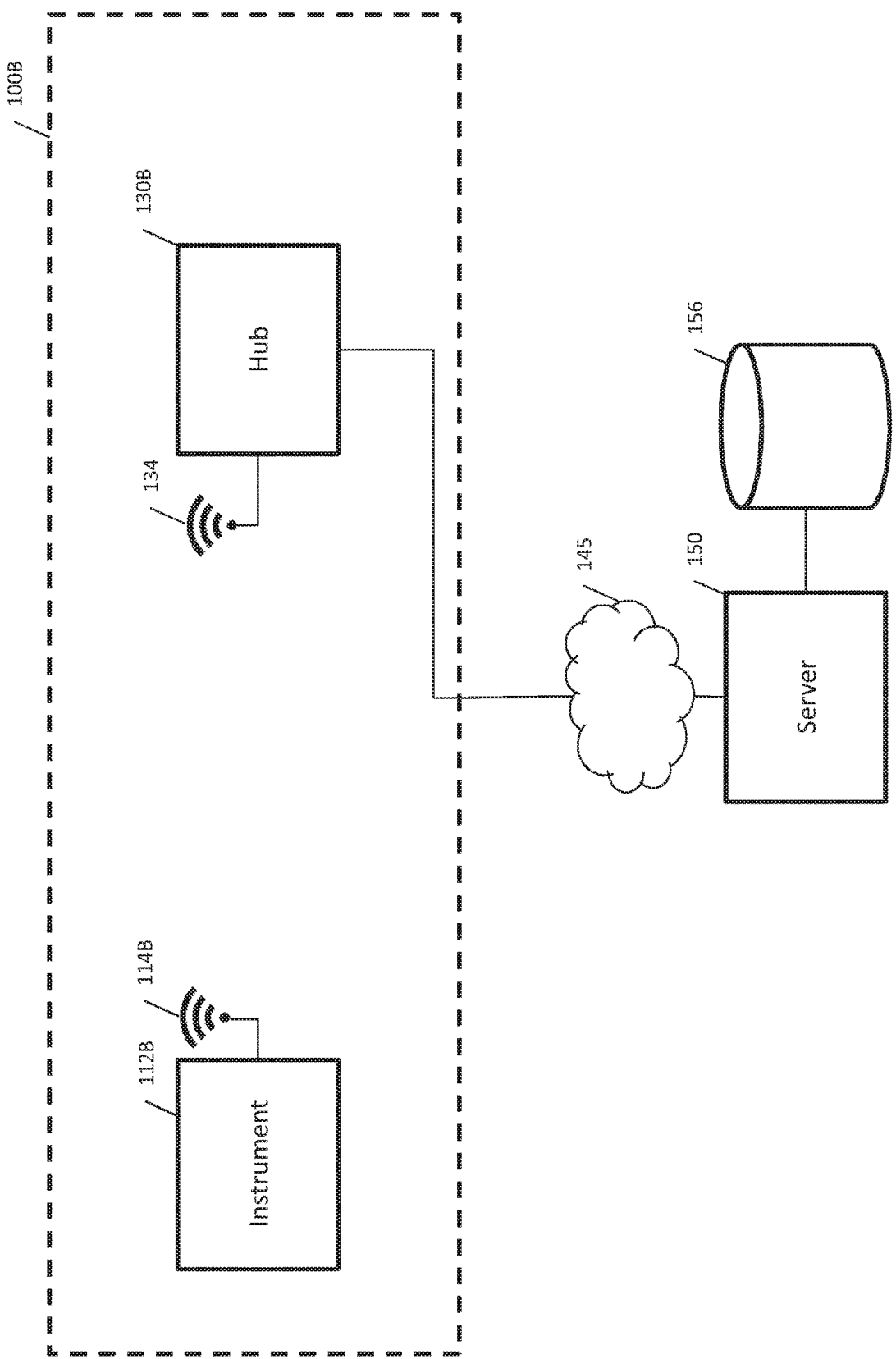

As will be described in greater detail below, the data hub 130 may control the instrument 112. Instrument control may be direct and without the need for an instrument-associated computers. FIG. 1B illustrates a wirelessly connected laboratory 100B where a data hub 130B remotely and directly controls the instrument 112B. In this embodiment, the scientific instrument 112B includes a wireless transmitter 114B installed during manufacture of the instrument 112B. To control the instrument 112B, the data hub 130B sends wireless commands through a wireless transceiver 134, and the instrument 112B receives the commands through its wireless transmitter 114B. The wireless signal directly communicates with firmware installed on the scientific instrument 112B to command it. The wireless signal to firmware direct command facilitates the control of scientific instrument 112B by the data hub 130 without a middle-man computer, such as the instrument-associated computer 110 of FIG. 1A.

Figure 3:
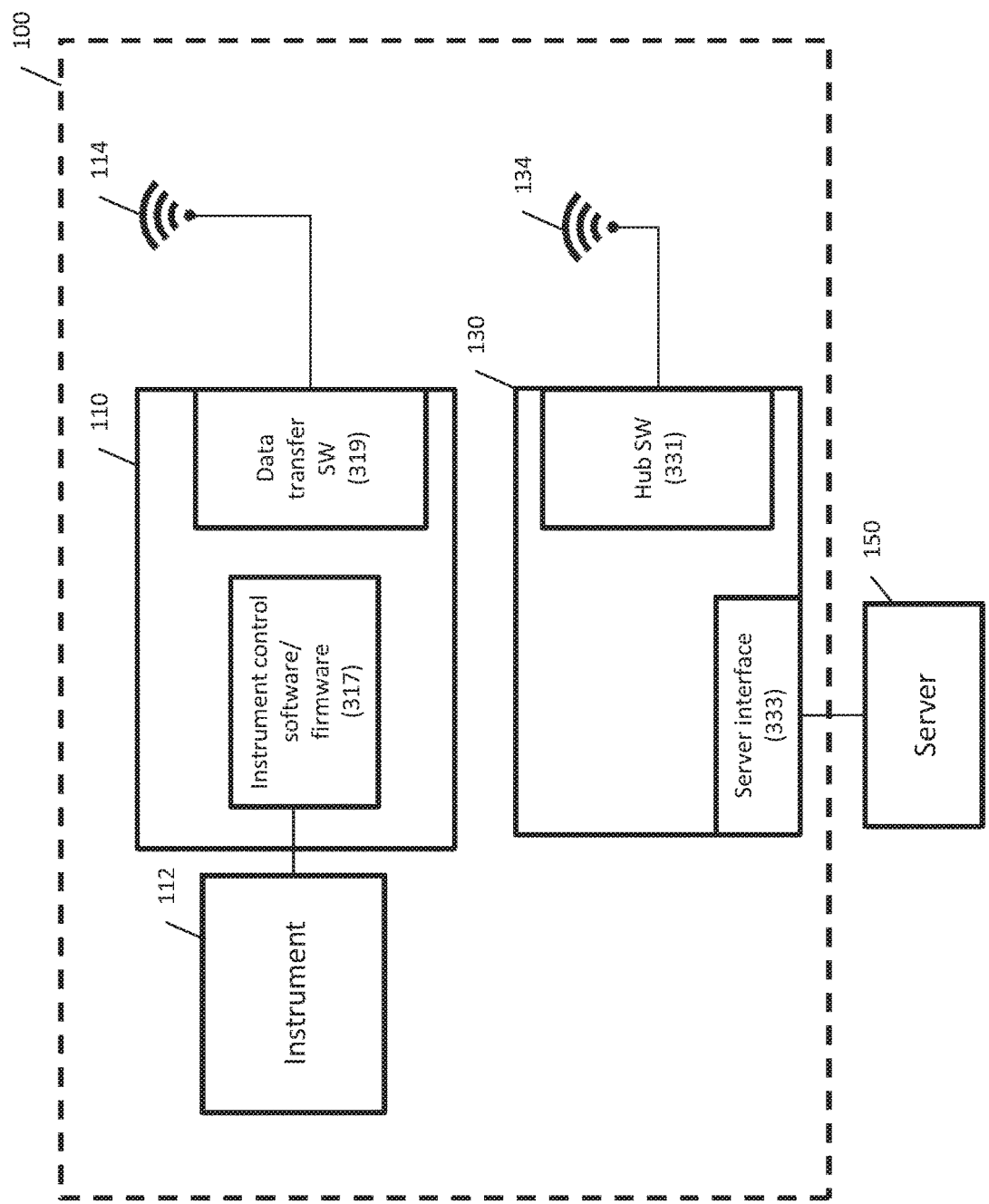
FIG. 3 illustrates software applications installed on a data hub and an instrument-associated computer.

Referring now to FIG. 3, the data hub 130 and the instrument-associated computer 110 execute software applications to assist in the process of wireless data transfer. The instrument-associated computer 110 may at least execute instrument control software/firmware 317 and data transfer software 319. The data hub 130 may at least execute hub software 331 and server communication software 333. While FIG. 3 only illustrates the instrument control software/firmware 317 and the data transfer software 319 installed on the instrument-associated computer 110, other software may exist on the instrument-associated computer, such as an operating system, etc. Similarly, the data hub 130 may execute other software applications other than the hub software 331 and the server communication software 333.

The instrument control software/firmware 317 comprises a list of computer-readable instructions and protocols necessary for the instrument-associated computer 110 to control and communicate with the instrument 112. Numerous instrument control software/firmware packages exist and generally depend on the manufacturer or the instrument 112.

The server communication software 333 creates an interface between the data hub and a server for secure and accurate transfer of life science data. An example of software suitable for use as server communication software 333 is described in Patent Application No. 62/090,589, filed Dec. 11, 2014, which is incorporated by reference herein. The server communication software 333 may automatically upload the files to the server 156. When the server interface 333 intends to send data, the server interface 333 will create a file container and upload the data via the file container. The interface may target a file directory location of one or more FCS files and creates a new file containing all the relevant FCS files. For example, the file created by the interface may be an ACS file or a Zip file. The ACS file may include all the FCS files generated by the instrument control software 317 based on the findings of the acquisition instrument.

When the interface 333 creates the ACS file, the interface packages all FCS files acquired from a sample by the acquisition instrument. Furthermore, the interface employs file fidelity checks by calculating checksum values for each FCS file and the FCS file's associated artifacts. As examples, these checksums may be SHA or MD5 checksums. After calculating the checksum for each data file, the interface 333 generates a manifest listing each file contained in the ACS file as well as each data file's associated checksum value. This manifest may be an XML manifest or an XML table of contents, but other manifest file types may be employed. The FCS files within the ACS file may be compressed so that the data hub 130 transmits smaller files to the server.

The interface 333 may allow a user to select one or more locations as destinations for uploading the ACS file. The interface may upload the ACS files to a server, a central repository, a cloud, a networked computer, or any other location electrically connected to the data hub 130. For example, the ACS container may be uploaded to an analysis computer that performs data management, data pre-processing, and analysis protocols.

When the analysis server 150 receives the ACS container, the server unpacks the a compressed file (e.g. ACS container) to find the contents (e.g. FCS files) contained therein. The server 150 checks the manifest against the FCS files found in the unpacking to verify that the FCS files listed in the manifest match up with the unpacked FCS files. The server 150 further performs a data quality check by calculating the checksums for each data file contained in the ACS container and then compares the calculated checksums with the checksums listed in the manifest to verify that the checksums match up. If any discrepancies exist, the server determines that data was corrupted in transit and requests the interface to resend another compressed file container.

When uploading data from the data hub 130, users may also annotate their experiments. Annotation creates an XML or other file providing metadata about the acquired data files, and the annotated metadata is added to the compressed file container. The interface may provide a graphical user interface including form boxes where users can enter information that annotates the experiment. As part of the annotation, the interface may require a user to select a manufacturer and a model of the scientific instrument 112 so that subsequent users may easily find out which instrument was used to acquire the sample data. Annotation may further include describing the sample's source, reagents used during acquisition, date, researcher's name, experiment's purpose, the institution performing the experiment, and other types of experiment identification. Annotation facilitates cataloguing to enable file and result querying, data sharing, and linking to other data types.

The data transfer software 319 may comprise software that is installed by a user to configure the instrument-associated computer 110 for wireless transfer of the scientific data. For example, the data transfer software 319 may be downloaded from the internet or packaged with an aftermarket transceiver 114 to be installed on the instrument-associated computer 110. In another embodiment, the data transfer software 319 is pre-installed on the instrument-associated computer 110. The data transfer software 319 may be configured to display a drag-and-drop interface on the instrument-associated computer 110, or the data transfer software 319 may determine when the instrument 112 has acquired new scientific data automatically by monitoring a watch folder or listening for alerts of new scientific data from the instrument control software 317. Furthermore, the data transfer software 319 may operate in a data push mode or a data pull mode. In the data push mode, the data transfer software 319 may transfer data whenever the transceiver 114 is paired or connected to the data hub 130 and the data transfer software 319 determines that new scientific data has been acquired by the instrument 112.

In the push mode, the data transfer software 319 may push data acquired in real-time to the data hub 130. Data acquired in real-time may be analyzed by the server 150 in real-time, thereby enabling analysis software installed on the server 150 to be offered as a service through cloud-based technologies. To stream data acquired in real-time, the data transfer software 319 may include a link to the instrument control software 317 to receive data as the instrument control software 317 receives it. If data is streamed to an analysis server 150 in real time, data could be analyzed in real-time as well or data analysis may be offered as a service.

In the pull mode, the data transfer software 319 may transfer scientific data at the direction of the data hub 130. In other words, the data transfer software 319 may wait for a signal from the data hub 130 instructing the data transfer software 319 to transmit the acquired scientific data to the data hub 130. If operating in the pull mode, the data transfer software 319 may hold data to be transferred in a queue until it can upload the scientific data to the data hub 130. In either mode, the data transfer software 319 may detect if an upload is interrupted and display upload progress to a user through a user interface.

In addition, the data transfer software 319 manages connection and reconnection to the data hub 319, such as by pinging for the data hub 130 and looking for a wireless signal identifying the data hub 130. The data transfer software 319 may comprise wireless communication protocols, such as a Bluetooth protocol, to facilitate the wireless data communication. The hub software 331 may also manage connection and reconnection.

Furthermore, the data transfer software 319 may generate an audit trail for the transferred scientific data. During acquisition, the instrument-associated computer 110 may generate metadata associated with the acquired data, such as by labelling the parameters under which the scientific data was acquired, the instrument make/model that acquired the data, the date and time of data acquisition, a clinical trial number, etc. The data transfer software 319 may add additional metadata associated with the acquired scientific data to describe when and how the scientific data was transferred to the data hub 130. For example, the data transfer software 319 may add timestamp metadata indicating when the instrument-acquired data was transferred to the data hub 130, which user transferred the acquired data, an identifier for the instrument-associated computer 110, and an identifier for the data hub 130 to which the scientific data was transferred. The additional metadata is transferred with the raw scientific data acquired by the instrument 112. This additional metadata creates an audit trail that the server 150 can use to make sure the data it receives and stores is an accurate representation of the scientific data acquired by the instrument 112. The added metadata may be in the form of XML, or any other type of markup language.

In one embodiment, the data transfer software 319 may facilitate instrument control from a computer device other than the instrument-associated computer 110, such as the data hub 130. In this embodiment, the data transfer software 319 may comprise an interface to the instrument control software 317. The interface to the instrument control software 317 may relay commands sent from a computer device other than the instrument-associated computer 110, such as the data hub 130. In another embodiment, instrument control may be passed to the server 150, and the server 150 may control an instrument 112 through both the data hub 130 and the data transfer software 319. For example, the server 150 may analyze scientific data collected by a flow cytometer and find the scientific data unsatisfactory or lacking key metadata. In response, the server 150 may transmit commands that control the instrument 112 to acquire scientific data that is satisfactory or exhibits the correct metadata. Additional features and functions of the data transfer software 319 will be illustrated with reference to FIGS. 4-7.

The hub software 331 performs many of the same functions as the data transfer software 319, such as adding additional metadata for audit trail purposes, and establishing connections with other computer systems, but the hub software 331 acts as a host. Thus, the hub software 331 may operate in the push and pull mode, but the hub software 331 initiates data transfer in the pull mode and detects incoming communications from clients in the push mode.

The hub 130 is further configured to determine a data end location based on the category or type of scientific data it receives from the instrument-associated computer 110. For example, the data hub 130 may transfer scientific data acquired by a flow cytometer (i.e. flow cytometry data) differently than scientific data acquired by mass spectrometer (i.e. mass spectrometry data). The hub 130 may read metadata added by the data transfer software 319 or metadata generated by the instrument control software 317 and determine the type of scientific data based on that metadata. The type of scientific data may depend on the instrument that acquired the scientific data, the experiment or study involved with the acquired data, the type of analyte sample tested or analyzed by the instrument, or any other indicator to differentiate scientific data types. Examples of data types may include flow cytometry data, mass cytometry data, cell sorter data, diagnosis data, immunology data, genotyping data, patient-specific data, clinical trial specific data, experiment-specific data, or any other category of data. The hub 130 is configured to recognize the scientific data by reading metadata associated with the scientific data or by analyzing the scientific data or the metadata and send the scientific data to an end location based on the determined type of data. The hub 130 may also read metadata about an operator's identity to determine where to transmit scientific data. For example, an analyst may transmit data to a personal database and a shared database according to his preferences, and the data hub 130 is configured to understand each user's preferences and send data according to those preferences. Any type of metadata may influence the determined end location for the data, such as metadata about a clinical trial or metadata from a specific laboratory or company that acquired the scientific data.

The hub software 331 may generate a user interface for display on a display device associated with the data hub 130. A user may configure associations between scientific data type and end locations using the user interface. The user interface may generate options and selections for data transfer and, if properly configured, remote control of the instrument 112. The user interface generated by the hub software 331 may vary depending on the type of instrument the hub software 331 is controlling.

In addition to these functions described above, the hub software 331 may include the server communication software 333 or includes an interface to communicate with the server communication software 333. The hub software 331 in cooperation with the server communication software 333 transmits the data received from the instrument-associated computer 110 and uploads the scientific data to the server 150. The server upload function may include creating a data transfer wrapper package, adding an XML manifest describing all the data to be sent to the server 150, and performing a checksum calculation for data validation.

The hub software 331 is capable of communicating with a plurality of instrument-associated computers, and the hub software 331 is capable of receiving scientific data from multiple instrument-associated computers 110 simultaneously. To perform simultaneous communication with multiple instrument-associated computers 110, the hub software 331 may comprise transfer queues to prevent data collisions. The hub software 331 may also log packet transfers if the wireless connection is interrupted.

Figure 4:
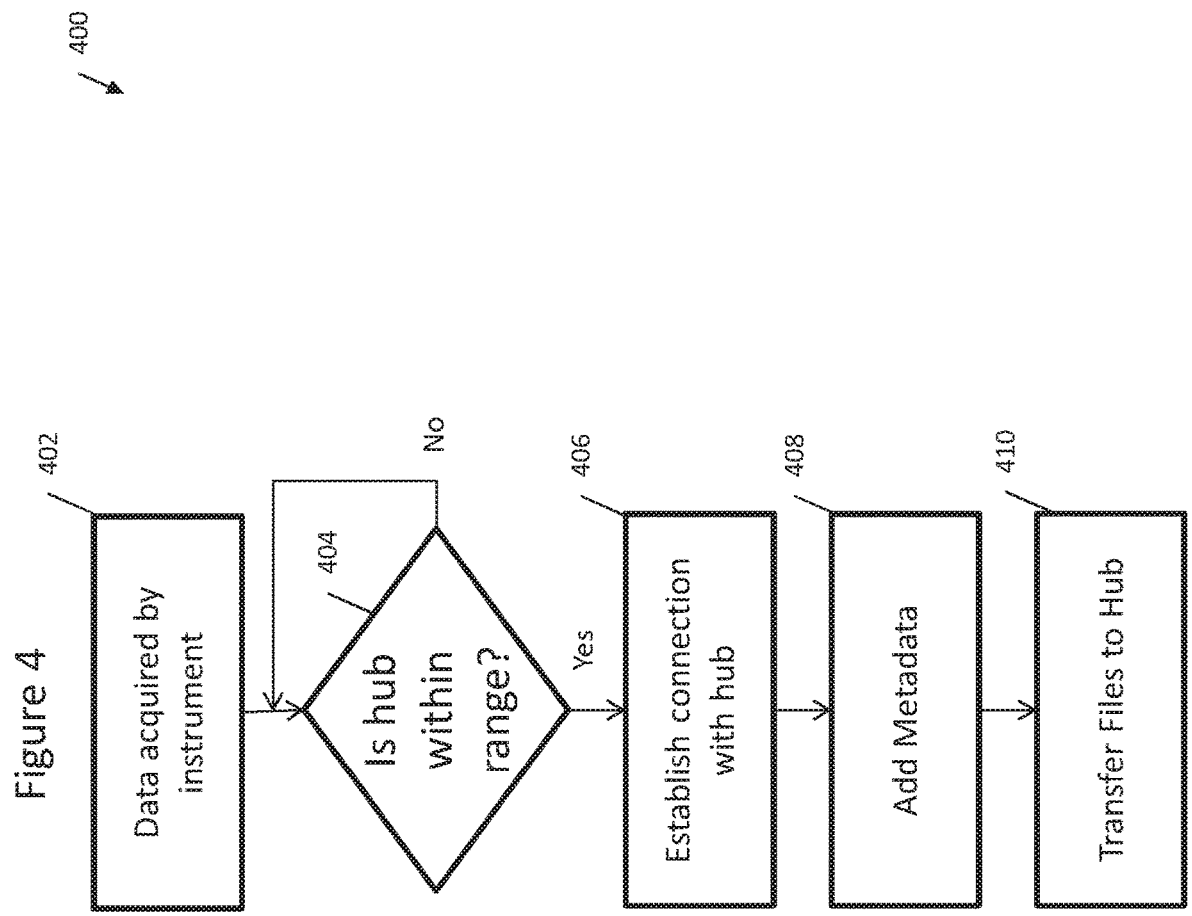
FIG. 4 illustrates a method for transferring data according to a push mode performed by an instrument-associated computer.

As mentioned above, data transfer may occur in the push or pull mode. FIG. 4 illustrates the push mode for data transfer. In the push mode, the instrument-associated computer 110 does not wait to receive a transfer command from the data hub 130, but instead waits until the data hub 130 is within range. The method 400 begins by the instrument-associated computer 110 receiving scientific data from the instrument 112 in step 402. The instrument-associated computer 110 may package the scientific data from the instrument 112 into a file according to the direction of the instrument control software 317.

After the instrument 112 has acquired all the scientific data or begun acquiring data, the data transfer software 319 detects whether the data hub 130 is within the wireless range of the transceiver 114 in step 404. The instrument-associated computer 110 will continue to search for the data hub 130 and no scientific data will be uploaded until the data transfer software 319 detects that the data hub 130 is within range. If the data hub 130 is within the wireless range of the transceiver 114, the method continues to step 406 where the data hub 130 and the instrument-associated computer 110 establish a wireless connection. Step 406 may include an authentication process to validate that the computer within range is a data hub 130. Connection establishment may occur according to any known method and may depend on the wireless standard used for wireless communication. For example, pairing may occur if Bluetooth is used for wireless communication.

As part of the process 400, the data transfer software 319 may add metadata to the data file created by the instrument control software 317 at step 408. This metadata addition may take the form of adding new metadata items to the file and/or amending metadata that is already in the file. The additional metadata may describe, for example, the type of instrument that acquired the data, the operator who acquired the data, and the time when the scientific data was acquired by the instrument 112. The metadata may also include a manufacturer of the instrument 112 and a model number of the instrument 112. Step 408 may occur at any time during the method 400, such as immediately after creating the file, after the instrument 112 finishes acquiring data, or as data is transferred. Alternatively, the data transfer software 319 may send a second file to the data hub 130 after transferring the scientific data. The data transfer software 319 may receive an indication of the type of instrument the instrument-associated computer 110 is associated with during installation of the data transfer software 319. This indication may come from a user selecting from a list, or the data transfer software 319 may receive an indication of the type of instrument from the instrument control software 317.

The method 400 continues when the data transfer software 319 transmits the scientific data to the data hub 130 in step 410. The data transmission may send scientific data as packets to the data hub 130, such as according to packet protocol set by the instrument 112 or other packet protocols such as TCP/IP. When the scientific data is transmitted, the data transfer software 319 may electronically sign the transferred data to create an audit trail. The audit trail will indicate each computer that received and transmitted the scientific data from acquisition to the data's final destination, which may be an analysis server, a database, etc. In addition, the data transfer software 319 may encrypt the scientific data before sending the scientific data to the data hub 130, and the data hub 130 may decrypt the data after receiving it.

In some embodiments, the data transfer to the hub 130 may occur after the instrument-associated computer 110 collects all the scientific data from the instrument 112, and in other embodiments, the data transfer software 319 may stream scientific data collected by the instrument 112 to the data hub 130 as the instrument 112 collects the scientific data. If streaming occurs, it is assumed that the instrument-associated computer 110 has established a wireless connection to the data hub 130.

Figure 5:
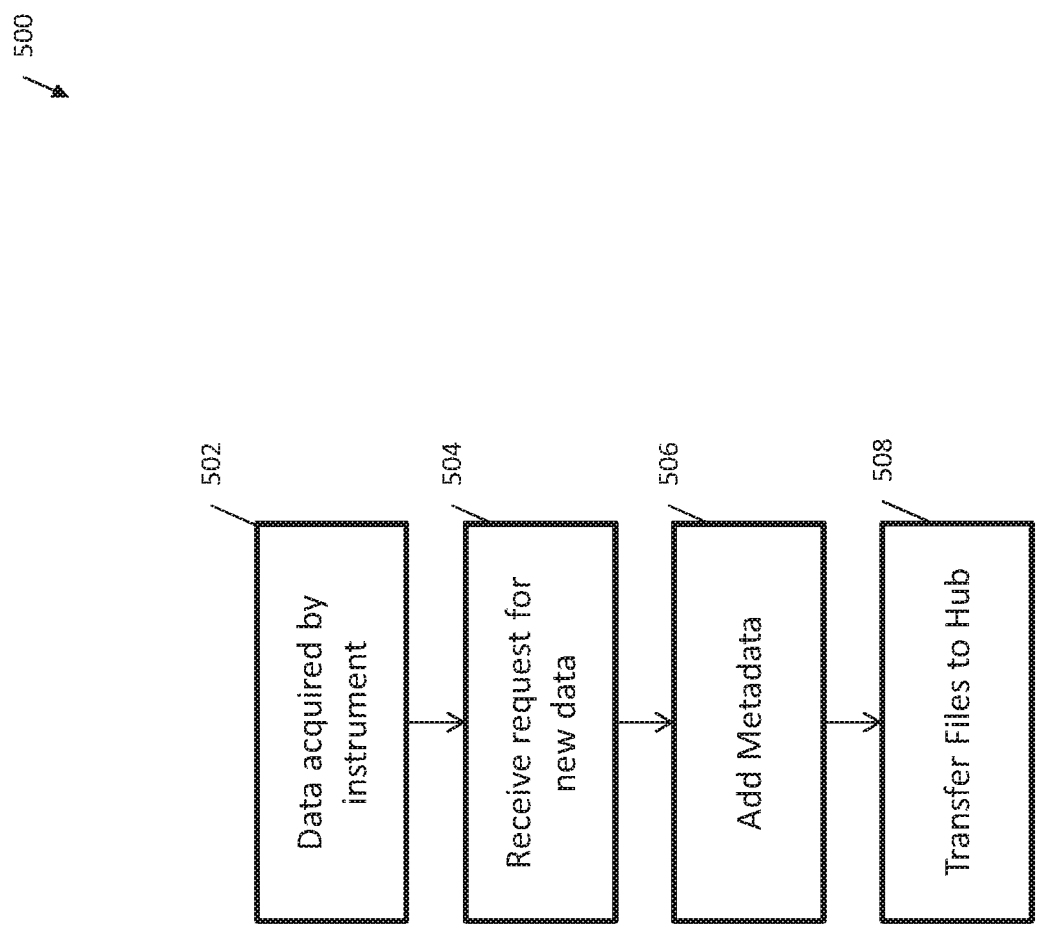
FIG. 5 illustrates a method for transferring data according to a pull mode performed by an instrument-associated computer.

FIG. 5 illustrates a method 500 for the pull mode for data transfer. In the pull mode, the instrument-associated computer 110 waits to receive a transfer command from the data hub 130. In the embodiment described in FIG. 5, it is assumed that the data hub 130 and the instrument-associated computer 110 have already established a wireless connection.

The method 500 begins when the instrument-associated computer 110 receives scientific data from the instrument 112 in step 402. The instrument-associated computer 110 may package the scientific data from the instrument 112 into a file according to the direction of the instrument control software 317, and the instrument-associated computer 110 may save the scientific data acquired by the instrument in machine-readable storage in anticipation for the data hub 130 to request a copy of the scientific data saved to the machine-readable storage.

After the instrument 112 has acquired all the scientific data or begun acquiring data, the instrument-associated computer 110 receives a request to send acquired scientific data to the data hub 130 in step 504.

As part of the process 500, the data transfer software 319 may add metadata to the data file created by the instrument control software 317 at step 506. As mentioned above, this metadata addition may take the form of adding new metadata items to the file and/or amending metadata that is already in the file. The additional metadata may describe, for example, the type of instrument that acquired the data, the operator who acquired the data, the type of scientific data acquired (e.g. flow cytometry data, genotyping data, mass cytometry data, etc.) and the time when the scientific data was acquired by the instrument 112. The metadata may also include a manufacturer of the instrument 112 and a model number of the instrument 112. The metadata may also simply describe the type of scientific data acquired, such as by indicating file type associated with a certain form of life science. Step 506 may occur at any time during the method 500, such as immediately after creating the file, after the instrument 112 finishes acquiring data, as scientific data is transferred, or in response to the request for scientific data from the data hub 130. Alternatively, the data transfer software 319 may send a second file to the data hub 130 after transferring the scientific data.

In response to the data hub's 130 data transfer request, the data transfer software 319 transmits the scientific data to the data hub 130 in step 508. The data transmission may send scientific data as packets to the data hub 130, such as according to the packet protocol set by the instrument 112 or other packet protocols such as TCP/IP. In addition, the data transfer software 319 may encrypt the scientific data before sending the scientific data to the data hub 130, and the data hub 130 may decrypt the data after receiving it.

The data hub 130 may request scientific data according to any method, such as at the direction of a user, whenever a new wireless connection is established between the data hub 130 and an instrument-associated computer 110, periodically, or on a scheduled basis. If the instrument-associated computer 110 does not have any new data, the instrument-associated computer 110 may respond to a data transfer request with a signal indicating that no new data has been acquired since the last data transfer request. The data transfer software 319 may log which data has been transferred to the data hub 130 and which data needs to be uploaded.

Figure 6:
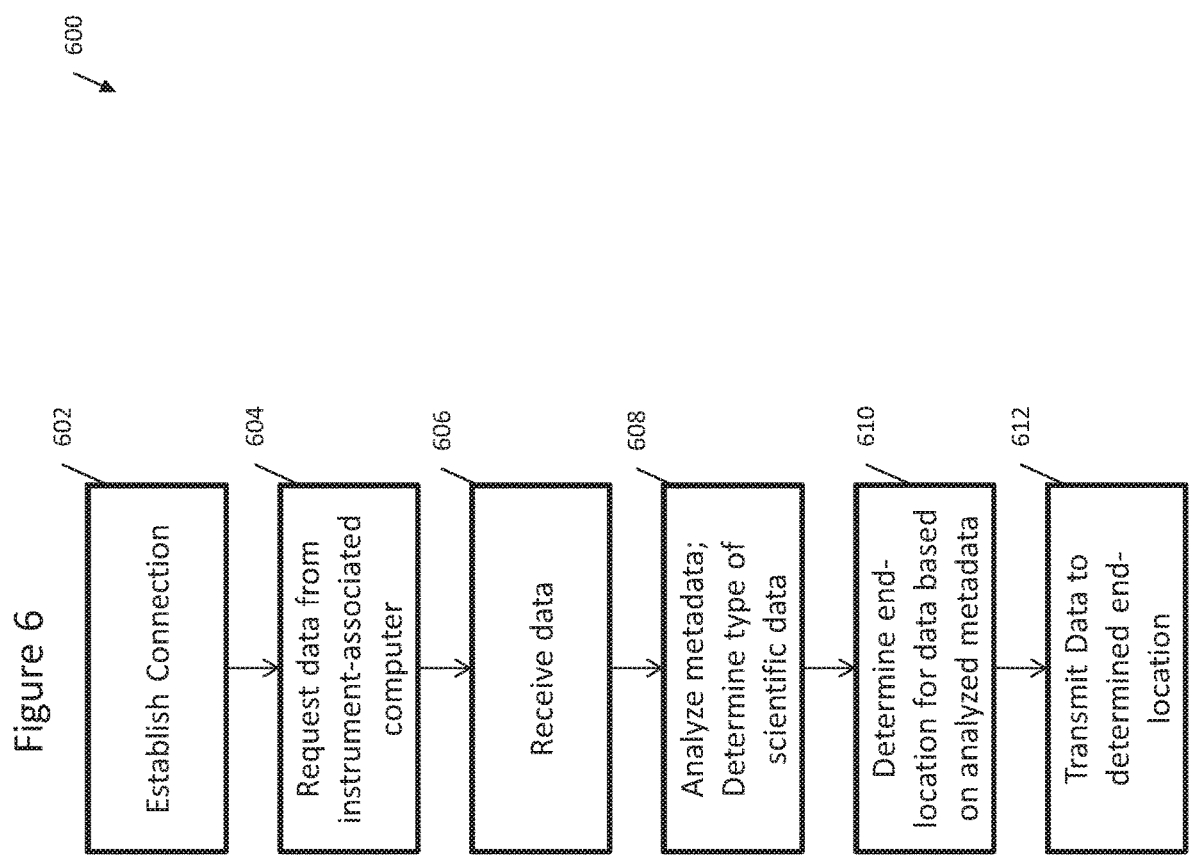
FIG. 6 illustrates a method for transmitting received data to an end-location by a data hub.

FIG. 6 illustrates a method 600 for transmitting received scientific data to an end-location by the data hub 130. The method 600 begins when the data hub 130 establishes a connection with the instrument-associated computer 110 in step 602. After establishing a connection, the data hub 130 may send a data transfer request to the instrument-associated computer 110 requesting any new scientific data to be uploaded to the data hub 130 in step 604. Step 604 may be omitted if the data hub 130 and instrument-associated computer 110 are operating in the push mode. The method 600 continues when the data hub 130 receives scientific data from the instrument-associated computer 110 in step 606.

After receiving the data, the hub software 331 reads metadata associated with the received scientific data to determine the type of scientific data the hub 130 received in step 608. The hub software 331 may determine this by determining the type of instrument that acquired the data, the make/model of the instrument 112, or another piece of metadata added by the data transfer software 319 or instrument control software 317. Based on the determined type of scientific data received, the hub software 331 determines an end location for the scientific data in step 610. The hub software 331 may store a table associating an end location with each type of scientific data. FIG. 9 illustrates an example table used by the data hub to determine where to transmit data acquired by a scientific instrument. As shown in FIG. 9, the table may include a plurality of columns. FIG. 9 illustrates four columns: a type of data column 990, and first end location column 992, a second end location column 994, and an N end location column 996. The first column identifies the type of data. The first, second, and N end location columns identify end locations where the data hub 130 should send the received scientific data. The number of end locations may depend on the type of data. In the example shown by FIG. 9, flow cytometry data may be sent to a FlowJo Enterprise Server and a State University Database, whereas mass cytometry may only be sent to the State University Database. While FIG. 9 illustrates 4 columns, more or fewer columns may be added depending on the number of end locations a user configures, but the table may always have at least two columns. A user may configure this table or the table may be a default. The end location for the scientific data may be a remote server, a scientific database, or simply the hard drive of the data hub 130. As shown in FIG. 9, the end location may be represented in the table by a network address or a file directory or a combination of the two.

Once the hub software 331 determines the end location for the scientific data, the hub 130 transmits the scientific data to the determined end location in step 612. The transmission may be according to any network protocol, such as UDP, TCP/IP, Bluetooth, etc. Uploading the scientific data to an end location may also trigger other events, such as triggering analysis process to be performed by an analysis server, or the data hub 130 may generate a notification to a user that the scientific data was uploaded to the end location. The hub software 130 may leverage the server interface 333 to transmit the data securely and accurately to the server 150. For example, the server interface may add checksum values and package the data transferred into a wrapped file format for data transfer.

Although not illustrated, the hub 130 may electronically sign the transmitted data, thereby adding to the audit trail. In embodiments where the hub 130 electronically signs the scientific data, the audit trail would include an electronic signature from the instrument-associated computer 110 and the data hub 130. Thus, the end location could determine each stop along the path from acquisition to saving the scientific data at the end location. In this way, the audit trail resembles a shipping manifest.

While FIGS. 4-6 illustrate the data transfer software 319 as identifying the instrument associated with the instrument-associated computer 110, the hub 130 may be configured to add this metadata upon receiving the scientific data from the instrument-associated computer 110. In this embodiment, the hub 130 may associate an instrument type with an identifier for the instrument-associated computer 110, such as a MAC address. The hub 130 may perform the metadata amending process in this embodiment.

In addition, the hub 130 may link together scientific data acquired from multiple instruments. Linking the scientific data enables an analysis server to perform integrated analysis of scientific data acquired by multiple different instruments. The linking process may involve the hub 130 reading metadata generated by the instrument 112, the instrument-associated computer 110, or the data transfer software 319 to find scientific data associated with the same patient, the same study, the same experiment, or any other linking piece of information. Operators may add identifiers that the hub software 331 may use to link together data from different instruments.

Figure 7:
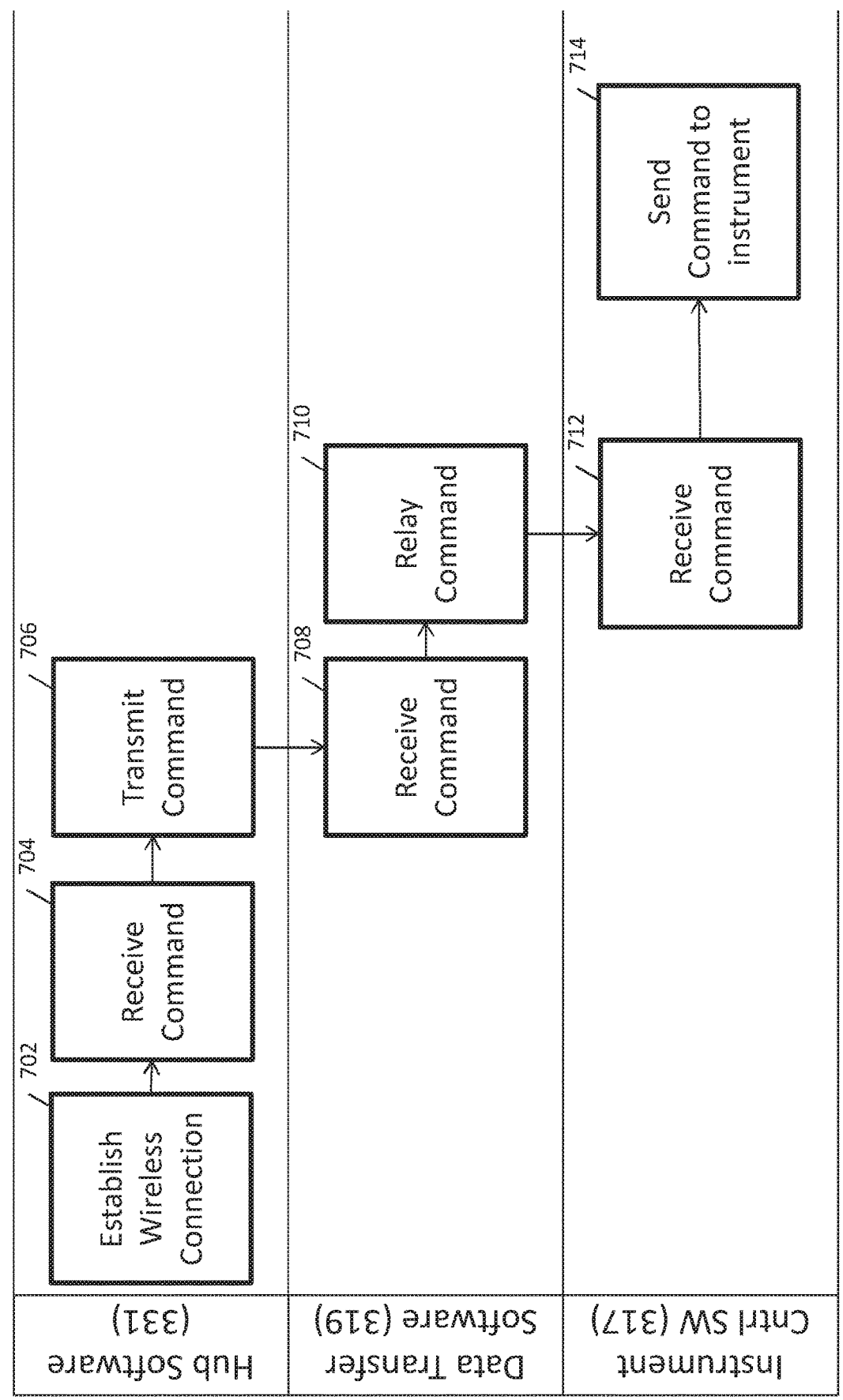
FIG. 7 illustrates a method for controlling an instrument from a computer other than an instrument-associated computer.

FIG. 7 illustrates a method for controlling the instrument from a computer other than the instrument-associated computer 110. To enable control at another computer, such as the data hub 130, the data transfer software 319 may communicate with the instrument control software 317 through an interface.

The method 700 begins when the hub software 331 establishes a connection with the instrument-associated computer 110 in step 702. The hub software 331 may present a user interface to a user. The user interface may indicate when the hub software 331 has successfully connected to the instrument-associated computer 110 wirelessly. A user may use the user interface to select an instrument-associated computer 110 to connect to. The user interface may present a plurality of options, such as initiating a request to download new scientific data from the instrument-associated computer 110 or a list of commands that a user could send to the instrument 112 to control the instrument 112. This list of commands may be similar or identical to the list of commands available to a user through a user interface generated by the instrument control software 317. The hub software 331 receives a command to control the instrument 112 through the user interface in step 704. In response, the hub software 331 transmits the command to the data transfer software 319 installed on the instrument-associated computer 110 in step 706, and the data transfer software 319 receives the transmitted command in step 708.

In response to receiving an instrument control-related command, the data transfer software 319 relays the command to the instrument control software 317 through the interface in step 710. The instrument control software 317 receives the command in step 712. The instrument control software 317 responds to a command sent from the data transfer software 319 similarly to a command it may receive from a user through a user interface generated by the instrument control software 317, however the source of the command is not from a user, but instead from the data transfer software 319, which was relayed. So, the instrument control software 317 receives the command signal from the data transfer software 319, and the instrument control software 317 commands the instrument 112 according to the protocols set forth in the instrument control software/firmware 317.

The relaying features and two-way communication created by the hub software 331 and the data transfer software 319 facilitates instrument control at computers other than the instrument-associated computer 110. In fact, data hubs 130 may be chained together such that, for example, an instrument in Oregon may be controlled by a data hub 130 in Chicago. To facilitate long distance instrument control, a first data hub may send a data signal to a second data hub over a WAN connection. The second data hub may be within wireless range of the instrument-associated computer 110. The second data hub may receive commands from the first data hub over a WAN and relay those commands to the data transfer software 319. In some embodiments, instruments may comprise robotic arms capable of automatically loading samples. In these robotic embodiments, no human needs to be present at the instrument 112 to control the instrument 112 and receive scientific data acquired by the instrument 112.

Depending on the type of scientific data acquired by the instrument 112, the hub software 331 may send the acquired scientific data to an analysis server. The analysis server may find the scientific data unsatisfactory or needing to be analyzed under different conditions or parameters. Because the data hub 130 can control the instrument 112, the analysis server may send new parameters to the data hub 130, and the data hub 130 may instruct the instrument to analyze the sample or another sample under new parameters calculated by the analysis server as a result of analyzing the first data transmitted.

Figure 10:
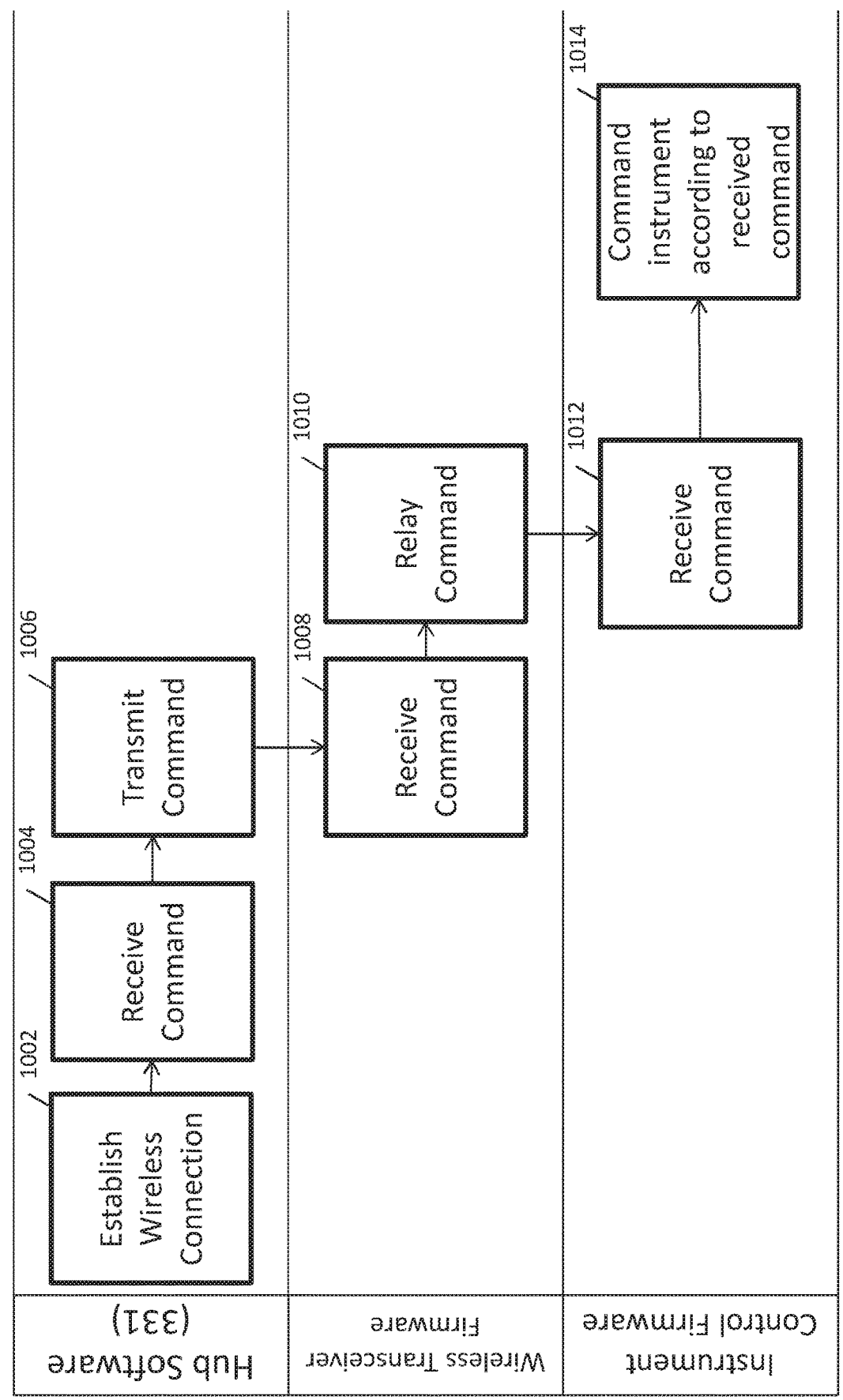
FIG. 10 illustrates a method 1000 for instrument control without an instrument-associated computer.

The method 700 may change slightly if there is no instrument-associated computer (see FIG. 1B). FIG. 10 illustrates a method 1000 for instrument control without an instrument-associated computer. Steps 1002, 1004, and 1006 are substantially similar to steps 702, 704, and 706 in FIG. 7. In step 1008, a first firmware module receives the command sent from the hub software 331. The first firmware module may control the operations of the wireless transmitter 114B. Next in step 1010, the first firmware module relays the command received to a second firmware module. The second firmware module may control the operation of the scientific instrument 112B and control the gathering of scientific data. The second firmware module receives the command from the first firmware module in step 1012, and the second firmware module controls the scientific instrument 112B according to the received command in step 1014.

In view of the foregoing, it will be seen that the several advantages are achieved and attained by example embodiments of the invention. For example, scientific data acquired by an instrument is transferred safely, securely, and on an order of magnitude faster than conventional data transfer methods. Additionally, an instrument-associated computer system can transfer scientific data wirelessly without connecting it to an LAN or WAN, thereby maintaining instrument insulation and abiding by manufacturer recommendations or mandates.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An apparatus for wirelessly integrating a scientific instrument with a data hub, the apparatus comprising:
a processor coupled with a non-transitory computer-readable storage medium storing processor-executable instructions;
wherein the processor is configured to execute the processor-executable instructions to at least:
receive scientific data from a scientific instrument, generate metadata about the scientific data based at least in part on a type of the scientific data, the generated metadata comprising data indicative of the type, identify a destination data hub for the scientific data and the metadata, and direct a wireless transmitter to wirelessly transmit the scientific data and the metadata to the destination data hub via a personal area network.

2. The apparatus of claim 1, wherein receiving the scientific data comprises receiving the scientific data from a flow cytometer, a mass spectrometer, a real-time polymerase chain reaction instrument, a sequencer, a spectrophotometer, a microarray, a genotyping instrument, a cell sorter, or a mass cytometer.

3. The apparatus of claim 1, wherein the personal area network comprises at least one of: Bluetooth, Zigbee, infrared communication, near-field communication, wireless USB, or IEEE 802.11.

4. The apparatus of claim 1, wherein the processor is further configured to, before directing the wireless transmitter to wirelessly transmit the scientific data, pair with the destination data hub via the wireless transmitter.

5. The apparatus of claim 1, wherein the processor is further configured to store the scientific data in a memory as at least one of: a Flow Cytometry Standard (FCS) file, a Comma Separated Values (CSV) file, a Classification Results (CLR) file, a Workspace (WSP) file, or a proprietary format set by a manufacturer of the scientific instrument.

6. The apparatus of claim 1, wherein the processor is further configured to generate a user interface for presentation through a display, wherein the user interface is configured to receive a command identifying the scientific data to be transmitted to the destination data hub.

7. The apparatus of claim 1, wherein the scientific data is stored in a folder included in a network accessible file directory after acquisition by the scientific instrument; and wherein the processor is further configured to monitor the folder to determine whether new scientific data has been acquired by the scientific instrument.

8. The apparatus of claim 7, wherein the processor is further configured to, in response to determining that the scientific instrument has acquired new scientific data, direct the wireless transmitter to wirelessly transmit to the destination data hub the new scientific data.

9. The apparatus of claim 1, wherein the processor is further configured to:

receive a request; and direct the wireless transmitter to wirelessly transmit the scientific data and the metadata to the destination data hub in response to the received request.

10. The apparatus of claim 9, wherein the processor is further configured to store the received scientific data in a queue while the processor awaits receiving the request.

11. The apparatus of claim 10, wherein the processor is further configured to generate data indicating whether the received scientific data has been transferred to the destination data hub.

12. The apparatus of claim 1, wherein the processor is further configured to direct the wireless transmitter to wirelessly transmit the scientific data and the metadata to the destination data hub in real-time as the processor receives the scientific data from the scientific instrument.

13. The apparatus of claim 12, wherein the processor is further configured to generate an electronic signature that indicates when the wireless transmitter was directed to wirelessly transmit the received scientific data to the destination data hub, and wherein the metadata includes the electronic signature.

14. The apparatus of claim 13, wherein the electronic signature further comprises an identifier associated with the processor.

15. The apparatus of claim 1, wherein the processor is further configured to generate first data indicating an instrument type for the scientific instrument, and second data indicating when the scientific instrument acquired the scientific data; and wherein the metadata includes the first data and the second data.

16. The apparatus of claim 15, wherein the processor is further configured to generate third data indicating at least one of: (i) a manufacturer of the scientific instrument, and (ii) a model number of the scientific instrument; and wherein the metadata includes the third data.

17. The apparatus of claim 1, wherein the wireless transmitter is a wireless transceiver.

18. The apparatus of claim 1, wherein the scientific instrument comprises a flow cytometer, wherein the metadata identifies the scientific data as flow cytometry data, and wherein the metadata describes parameters under which the flow cytometry data was acquired.

19. A computer-implemented method for wirelessly integrating a scientific instrument with a data hub, the method comprising:

under control of at least one processor:

receiving scientific data from a scientific instrument;

generating metadata about the scientific data based at least in part on a type of the scientific data, the generated metadata comprising data indicative of the type;

identifying a destination data hub for the scientific data and the metadata; and directing a wireless transmitter to wirelessly transmit the scientific data and the metadata to the destination data hub via a personal area network.

20. The computer-implemented method of claim 19, further comprising generating a user interface for presentation through a display, wherein the user interface is configured to receive a command identifying the scientific data to be transmitted to the destination data hub.

* * * * *